US012701056B2

(12) United States Patent
Khosrowpour et al.

(10) Patent No.: US 12,701,056 B2
(45) Date of Patent: Aug. 4, 2026

(54) NETWORK POWER AND PERFORMANCE SERVICE LEVEL AGREEMENTS

(71) Applicant: DELL PRODUCTS L.P., Round Rock, TX (US)

(72) Inventors: Farzad Khosrowpour, Pflugerville, TX (US); Mitchell Markow, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 179 days.

(21) Appl. No.: 18/606,154

(22) Filed: Mar. 15, 2024

(65) Prior Publication Data

US 2025/0293955 A1      Sep. 18, 2025

(51) Int. Cl.
| | |
|---|---|
| *H04L 41/5019* | (2022.01) |
| *H04L 41/046* | (2022.01) |
| *H04W 52/38* | (2009.01) |

(52) U.S. Cl.
CPC ........ *H04L 41/5019* (2013.01); *H04L 41/046* (2013.01); *H04W 52/386* (2013.01)

(58) Field of Classification Search
None
See application file for complete search history.

(56) References Cited

U.S. PATENT DOCUMENTS

| | | | | |
|---|---|---|---|---|
| 6,574,664 | B1 * | 6/2003 | Liu | H04L 61/00 |
| | | | | 709/224 |
| 2008/0316938 | A1 | 12/2008 | Shi | |

| | | | | |
|---|---|---|---|---|
| 2009/0265568 | A1 * | 10/2009 | Jackson | G06F 1/3203 |
| | | | | 713/320 |
| 2011/0271283 | A1 * | 11/2011 | Bell, Jr. | G06F 9/5094 |
| | | | | 718/102 |
| 2012/0259821 | A1 * | 10/2012 | Alam | H04L 67/288 |
| | | | | 707/E17.005 |
| 2015/0301572 | A1 * | 10/2015 | Zhou | G06F 1/3203 |
| | | | | 713/320 |
| 2018/0027063 | A1 * | 1/2018 | Nachimuthu | G08C 17/02 |
| 2018/0101215 | A1 * | 4/2018 | Mahindru | G06F 1/3296 |
| 2019/0281373 | A1 * | 9/2019 | Sadasivarao | H04Q 11/0062 |
| 2020/0133707 | A1 * | 4/2020 | Coster | G06F 1/329 |
| 2021/0351981 | A1 * | 11/2021 | Torres | H04L 41/0823 |
| 2022/0116289 | A1 * | 4/2022 | Ramanathan | H04L 41/5051 |

(Continued)

FOREIGN PATENT DOCUMENTS

| | | | | | |
|---|---|---|---|---|---|
| EP | 0980167 | A1 * | 2/2000 | | H04L 49/602 |
| EP | 4030693 | A1 * | 7/2022 | | H04L 41/122 |

(Continued)

*Primary Examiner* — Sandarva Khanal
(74) *Attorney, Agent, or Firm* — Larson Newman, LLP

(57) ABSTRACT

An information handling system stores a service level agreement for an application. The system collects data associated with a network. The data includes a power consumption of an access point of the network. Based on the collected data and the service level agreement of the application, the system determines whether the application is a candidate for migration. In response to the application being a candidate for migration, the system provides a transmit power level increase request to the access point. After the transmit power level increase request is provided, the system provides the application to a remote compute device of the network via the access point.

16 Claims, 4 Drawing Sheets

(56) References Cited

U.S. PATENT DOCUMENTS

| | | | |
|---|---|---|---|
| 2022/0291734 A1* | 9/2022 | Wilde | ................... G06F 1/3203 |
| 2023/0385045 A1 | 11/2023 | Wang et al. | |
| 2025/0227615 A1* | 7/2025 | Lai | ........................ H04W 40/08 |

FOREIGN PATENT DOCUMENTS

| | | | | |
|---|---|---|---|---|
| WO | WO-2013155344 A1 * | 10/2013 | ........... | H04L 63/104 |
| WO | WO-2025074138 A1 * | 4/2025 | ......... | H04L 43/0858 |

\* cited by examiner

100

NETWORK POWER AND PERFORMANCE SERVICE LEVEL AGREEMENTS

FIELD OF THE DISCLOSURE

The present disclosure generally relates to information handling systems, and more particularly relates to implementing network power and performance service level agreements.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling may store a service level agreement for an application. A processor may collect data associated with a network. The data may include a power consumption of an access point of the network. Based on the collected data and the service level agreement of the application, the processor may determine whether the application is a candidate for migration. In response to the application being a candidate for migration, the processor may provide a transmit power level increase request to the access point. After the transmit power level increase request is provided, the processor may provide the application to a remote compute device of the network via the access point.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
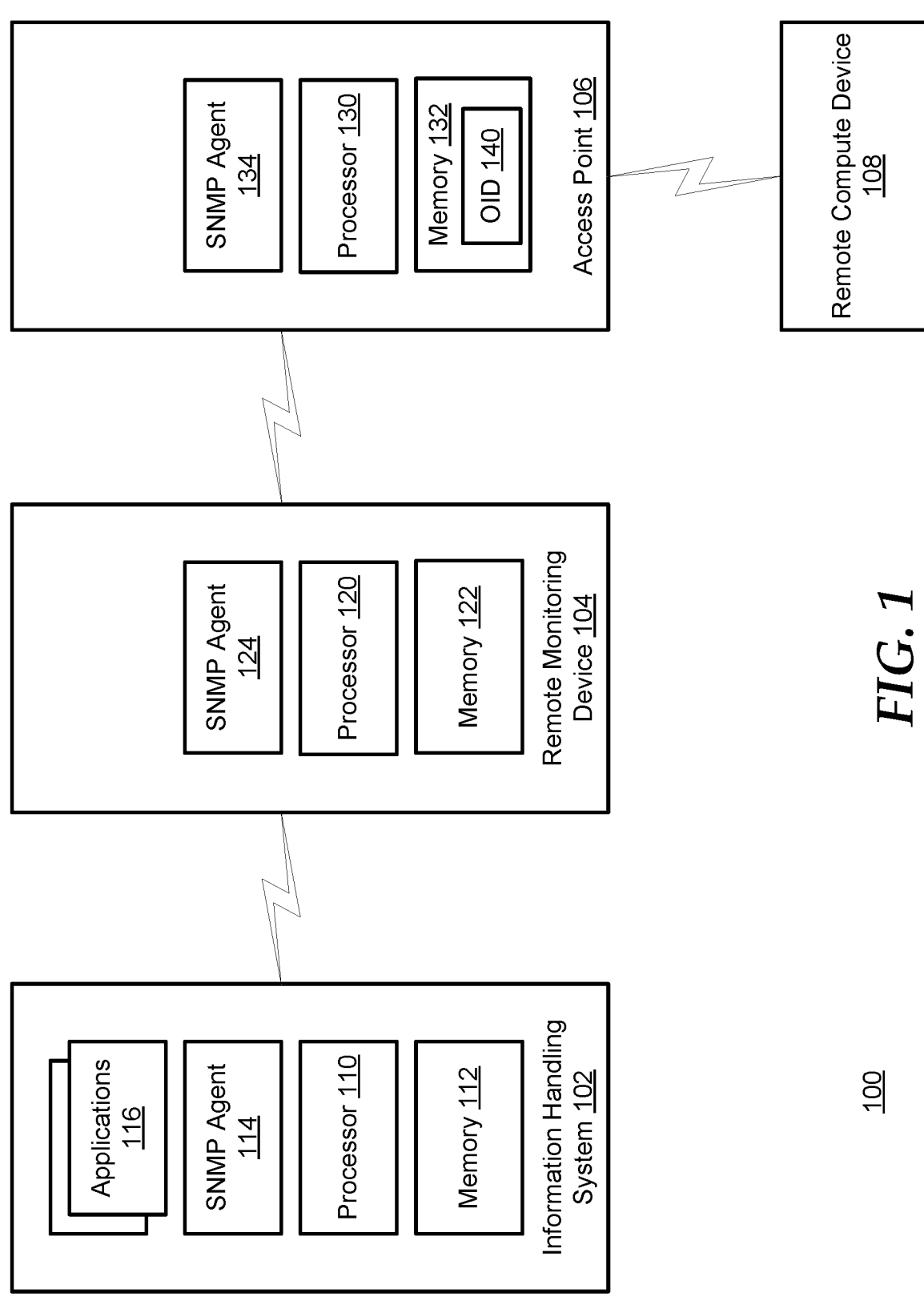
FIG. 1 is a block diagram of a portion of a system including an information handling systems, a remote moni-toring device, and an access point according to at least one embodiment of the present disclosure.

FIG. 1 illustrates a system 100 including an information handling systems 102, a remote monitoring device 104, an access point 106, and a remote compute device 108 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 102 includes a processor 110, a memory 112. In an example, processor 110 may perform one or more suitable operations to execute a simple network management protocol (SNMP) agent 114 and multiple applications 116. Remote monitoring device 104 includes a processor 120 and a memory 112. In certain examples, information handling system 102 may include a central processing unit (CPU), such as CPU 402 and 404 of FIG. 4, to execute workloads of applications 126. In an example, processor 120 may perform one or more suitable operations to execute a SNMP agent 124. Access point 106 includes a processor 130 and a memory 132. In an example, processor 130 may perform one or more suitable operations to execute a SNMP agent 134. In certain examples, memory 132 may store any suitable data associated with access point 106 including, but not limited to, object identifier (OID) data 140 for a management information base (MIB) of the access point. In an example, remote compute device 108 may be any suitable compute device external to information handling system 102, such as a cloud server, an edge server, or the like. Information handling system 102 may include additional components without varying from the scope of this disclosure. Remote monitoring device 104 may include additional components without varying from the scope of this disclosure. Access point 106 may include additional components without varying from the scope of this disclosure.

During operations of information handling system 102, remote monitoring device 104, and access point 106, these devices may perform cloud-based application optimization. In certain examples, applications 126 may execute different workloads. These workloads may require migration from information handling system 102 to an edge device, such as remote compute device 108, via access point 106 or from the edge device to the information handling system. In an example, power consumption of the network is an important role or criteria in the decision making to determine the efficiency of the workload locality such as in the cloud or locally on information handling system 102. In certain examples, power consumption in the network is not only the power consumed by information handling system 102 and an edge server, but also includes the power efficiency of access point 106 through which the data and payloads travel. In an example, the power consumption of the network and access point 104 may become even more important based on 5G communication as the power consumption may excessively change. Additionally, network versus system priorities may need to be coordinated to avoid conflict management in managing performance/power for a target application 116.

In previous information handling systems, the information handling system may not coordinate the network layer functionality with other system policies. In previous information handling systems, no mechanism existed to create an application service level agreement (SLA) that includes overall network power consumption. These previous information handling systems would not be able to utilize this application SLA because the network layer may be managed independent of the client application and managed by information technology decision maker (ITDM). Additionally, in previous systems, the router, such as an access point, power management is usually done or managed for device management only and does not include system data.

Information handling system 102 may be improved by processor 110 utilizing a network SLA in decision making for application migration. The processor 110 may also improve the application usage by managing optimization of access point 106 based on a combination of power consumptions, such as power consumption in information handling system 102, power consumption in access point 106 and other devices of network 100. Additionally, processors 110, 120, and 130 may coordinate native functionality across CPU, graphics processing unit (GPU), and network resources required by target applications 116.

In an example, during an initialization of information handling system 102, remote monitoring device 104, and access point 106 a determination may be made that all of these devices are SNMP enabled. After these determinations, processor 110 may create SNMP agent 114 on information handling system 102. In an example, SNMP agent

114 may allow or enable processor 110 to run remote network monitoring (RMON) via SNMP. The execution of RMON by processor 110 may enable management of information on network devices within network 100. In certain examples, SNMP agent 114 may be a containerized application, such that the SNMP agent may run on any compute node on the network, such as remote monitoring device 104, access point 106, or the like. In situations when SNMP agent 114 is transferred to remote monitoring device 104, the SNMP agent is represented and described as SNMP agent 124 and the SNMP agent may execute the RMON. Similarly, when SNMP agent 114 is transferred to access point 106, the SNMP agent is represented and described as SNMP agent 134.

After SNMP agent 114 is created in information handling system 102, information handling system 102 may discover remote monitoring device 104 and access point 106 via a communication channels in network 100. In response to the discovery of access point 106, processor 110 may register the access point with SNMP agent 114. In certain examples, the registration of access point 106 with SNMP agent 114 may be stored within memory 112 of information handling system 102.

In an example, after creation of SNMP agent 114, processor 110 may transfer the operation of the SNMP agent to remote monitoring device 106. In this example, processor 120 may execute SNMP agent 124 to discover both information handling system 102 and access point 106. Processor 120 may perform one or more suitable operations to retrieve registration information for information handling system 102 and registration information for access point 106. In certain examples, processor 120, via SNMP agent 124, may store registration information associated with information handling system 102 and the registration information associated with access point 106 in memory 112 for later use by the SNMP agent.

In certain examples, processor 120, via SNMP agent 124, may collect MIB/OID data/information from information handling system 102 and access point 106. Based on the collected MIB/OID data, SNMP agent 124 may determine whether information handling system 102 and access point 106 have proper MIB and OID functionality for power reporting. If information handling system 102 and access point 106 have the proper MIB and OID data, SNMP agent 124 may configure the access point for power configurations reporting and asynchronization notifications.

In an example, processor 120, via SNMP agent 124, may collect power and performance information from information handling system 102. For example, the power and performance information may be any suitable information including, but not limited to, information associated with application 126 and information associated with the entire information handling system 102. Additionally, remote monitoring device 104 may receive power and performance information for network 100 and access point 106. In an example, the power and performance for network 100 may include a combination the power and performance of communication channels, edge compute devices, access point 106, or the like.

In certain examples, SNMP agent 124 may query access point 106 to retrieve the power consumption of the access point. In an example, the query may include the OID associated with the power consumption of access point 106. In response to receiving the query, processor 120 may utilize the OID within the query to identify the data associated with the query. In this situation, SNMP agent 134 may collect a current power consumption of access point 106. In response to the collection of the current power consumption, processor 130 may provide the power consumption of access point 106 to SNMP 124 of remote monitoring device 104.

In an example, SNMP 124 may further provide information to processor 130 of access point 106. This information may be utilized by processor 130 to track the power consumption of access point 106 related to particular internet protocol (IP) packets. In certain examples, the power consumption related to particular IP packets may be performed via a custom MIB. The custom MIB may perform any suitable number of operations including, but not limited to, monitoring power consumption and the ability to change the transmit power of access point 106. In an example, the transmit power in access point 106 may be any suitable setting level, such as a low setting, a medium setting, a high setting, or like. SNMP agent 124 may provide this information to a native quality of service (QOS) manager on information handling system 102. Processor 110 may execute the QoS manager to determine an overall system level efficiency for data migration.

In certain examples, processor 110 may perform one or more operations to execute application 126. During the operation of application 126, processor 110 may determine whether the workload of application 126 should be transferred or migrated from information handling system 102 to another compute device in network 100, such as remote compute device 108. Processor 110, via QoS manager, may retrieve an SLA for the workloads of application from memory 112. In an example, the SLA may be any suitable factors for performance of workloads in applications 126. For example, the SLA may be a network SLA that includes, but is not limited to, a latency, a performance level, a power consumption level, a carbon footprint level, a reliability level, and an efficiency level. In an example, the SLA may also include requirements for different resources needed to execute the workload of application 126, such as a graphic processing unit (GPU) requirement, a central processing unit (CPU) requirement, or the like.

In an example, processor 110 may compare the information received from access point 106 through remote monitoring device 104 to the SLA for workloads of applications 126. The information from access point 106 may include any suitable data, such as a latency of network 100, an overall power consumption of the network, carbon efficiency of remote compute device 108, reliability of the network, or the like. In an example, the latency of network 100 may include, but is not limited to, latency of access point 106, latency of remote compute device 108, and latency in communication paths of the network. The overall power consumption of network 100 may be the power consumption of any component in the network, such as access point 106, remote compute device 108, or the like.

In certain examples, processor 110 may further consider additional factors in network 110 with respect to the SLA of the workload for application 126. For example, the SLA may determine whether network 100 includes the necessary components to execute the workload of application 126. Processor 110 utilize these different SLA factors to determine whether the workload of application 126 is a candidate for migration to remote compute device 108.

If the information about network 100 and in particular the power consumption of access point 106 fails to comply with the SLA, processor 110 may determine that the workload of application 126 is not a candidate for migration. In response to the workload not being a candidate for migration, processor 110 may continue to execute the workload on information handling system 102. However, if the information about network 100 and in particular the power consumption of access point 106 comply with the SLA, processor 110 may determine that the workload of application 126 is a candidate for migration.

In response to the workload of application 126 being a candidate for migration, processor 110 may provide a request for a transmit power level of access point 106 to be increased. In an example, processor 110 may provide the request to the increase the transmit power level of access point 106 via SNMP agent 114. Based on the request, access point 106 may increase the transmit power level by any suitable manner. For example, processor 110 may perform operations to change the power level setting in the network interface card, radio transmitter card, or the like. After the transmit power level has been increased, information handling system 102 may migrate the workload of application 126 to remote compute device 108 via access point 106. In certain examples, the transmit power level of access point 106 may be lowered after the workload has been migrated to remote compute device 108.

As described herein, processor 110 may utilize a network SLA in determining whether application 126 is a candidate for migration from information handling system 102 to remote compute device 108. Additionally, execution of SNMP agents 114, 124, and 134 may enable optimization of access point 106. In particular, one or more of SNMP agents 114, 124, and 134 may control or manage a transmit power level in access point 106. For example, the transmit power level may be reduced or placed at a low or medium level when migration of the workload is not being performed. Then, when application 126 is migrated to remote compute device 108, SNMP agent 134 may increase the transmit power level of access point 106. In certain examples, these operations of information handling system 102, remote monitoring device 104, and access point 106 may coordinate functionality of CPUs, GPUs, and other resources of network 100 as required by application 126.

Figure 2:
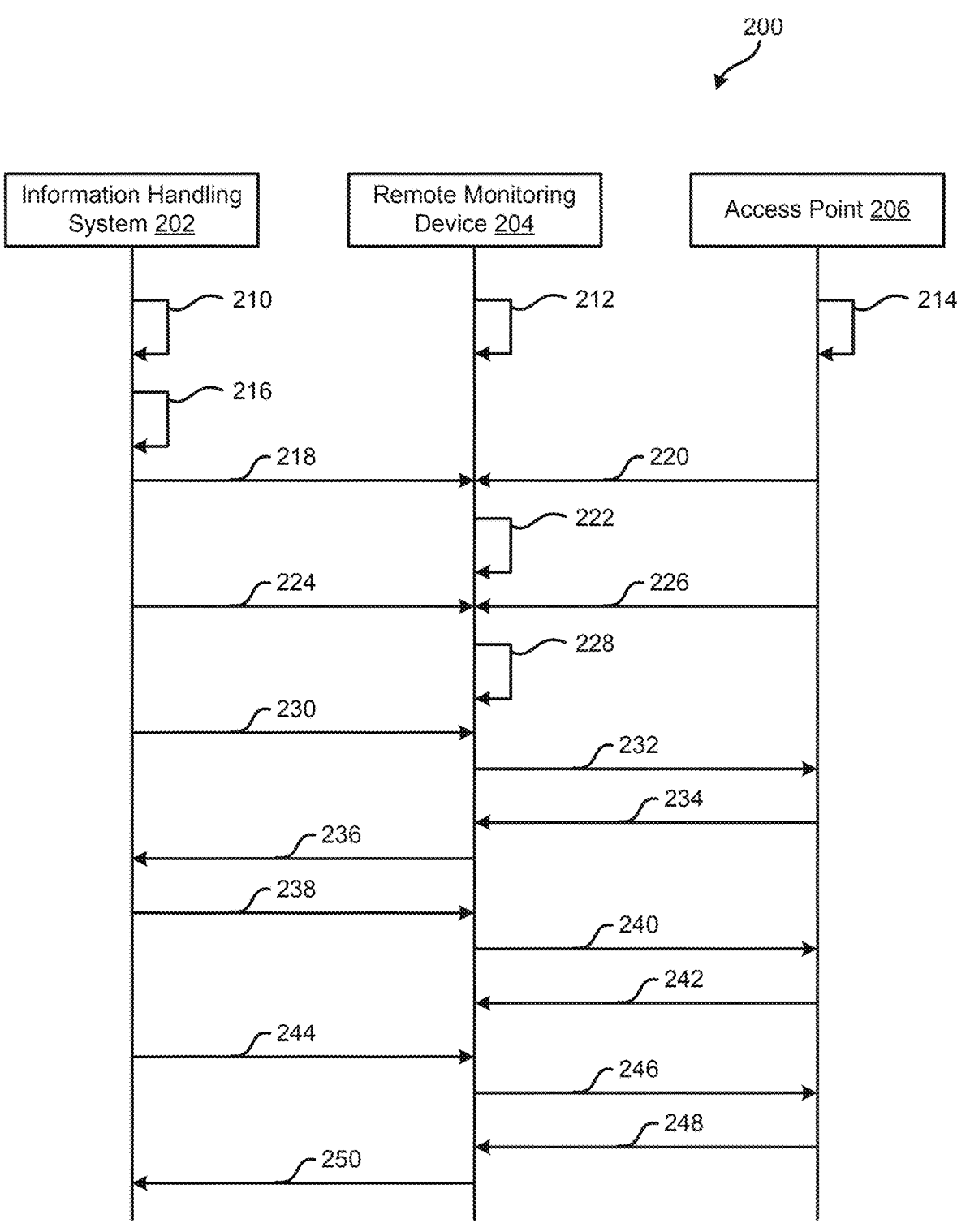
FIG. 2 is a flow diagram of a method for enabling a system level service level agreement to include a network stack according to at least one embodiment of the present disclosure.

FIG. 2 is a flow diagram of a method 200 for enabling a system level service level agreement to include a network stack according to at least one embodiment of the present disclosure. It will be readily appreciated that not every method step set forth in this flow diagram is always necessary, and that certain steps of the methods may be combined, performed simultaneously, in a different order, or perhaps omitted, without varying from the scope of the disclosure. FIG. 2 may be employed in whole, or in part, an information handling system 202, a remote monitoring device 204, an access point 206, or any other type of controller, device, module, processor, or any combination thereof, operable to employ all, or portions of, the method of FIG. 2. Information handling system 202 may be substantially similar to information handling system 102 of FIG. 1, remote monitoring device 204 may be substantially similar to remote monitoring device 104 of FIG. 1, and access point 206 may be substantially similar to access point 106 of FIG. 1. In certain examples, operations of information handling system 202, remote monitoring device 204, and access point 206 described herein may be performed by processors of the respective devices.

At step 210, information handling system 202 may enable SNMP to enable the information handling system to communicate with remote monitoring device 204 and access point 206. At step 212, remote monitoring device 204 may enable SNMP to enable the information handling system to communicate with information handling system 202 and access point 206. At step 214, access point 206 may enable SNMP to enable the information handling system to communicate with information handling system 202 and remote monitoring device 204.

At step 216, a RMON agent is initialized on information handling system 202. In certain examples, the RMON agent may be utilized by information handling system 202 to monitor information about access point 206. The monitoring of access point 206 may be performed by remote monitoring device 204 or any other suitable device within a network.

At steps 218, 220, and 222, remote monitoring device 204 may communicate with both information handling system 202 and access point 206 to perform a network discovery. In an example, access point 206 may identify additional compute devices within a network. At step 224, information handling system 202 provides device registration information to remote monitoring device 204. In an example, the registration information may indicate available resources of information handling system 202, applications being executed within the information handling system, or the like.

At step 226, access point 206 provides device registration information to remote monitoring device 204. The device registration information for access point 206 may include different transmission power levels available in the access point, resources available in other compute devices of the network, or the like. At step 228, remote monitoring device 204 processes the device registration information. In an example, remote monitoring device 204 stores the device registration information in memory 112.

At step 230, information handling system 202 provides a MIB/OID verification request to remote monitoring device 204. In an example, the OID request may be associated with or directed to access point 206. At step 232, remote monitoring device 204 forwards the MIB/OID verification request to access point 206. At step 234, access point 206 provides MIB/OID verification data to remote monitoring device 204. At step 236, remote monitoring device 204 forwards the MIB/OID data to information handling system 202. Based on the OID verification data, information handling system 202 may associate the OID data with access point 206 and store this association in a memory of the information handling system.

At step 238, information handling system 202 provides a configure OID request to remote monitoring device 204. In an example, the configure OID request may be to configure access point 206 for event notifications and thresholds. At step 240, remote monitoring device 204 forwards the configure OID request to access point 206. At step 242, access point 206 sets up the local OID for event notifications and thresholds and sets up a configure OID request response. In certain examples, the configure OID request response may identify that the data of access point 206 is able to be queried or retrieved by devices, such as information handling system 202, that have the proper OID. At step 244, information handling system 202 provides an OID data request to remote monitoring device 204. In an example, the OID data request may be directed to access point 206.

At step 246, based on the OID data request being directed to access point 206, remote monitoring device 204 may forward the OID data request from information handling system 202 to access point 206. In an example, the OID may be associated with power consumption data of access point 206. At step 248, access point 206 responds to the OID data request by providing the OID data to remote monitoring device 204. The data identified by the OID may be a current power consumption of access point 206. At step 250, remote monitoring device 204 forwards the OID data, such as power consumption of access point 206, to information handling system 202. Information handling system 202 may utilize the power consumption of access point 206 and other network resource data to determine whether a workload may be migrated. In an example, this determination may also be based on an SLA for the workload of the application.

Figure 3:
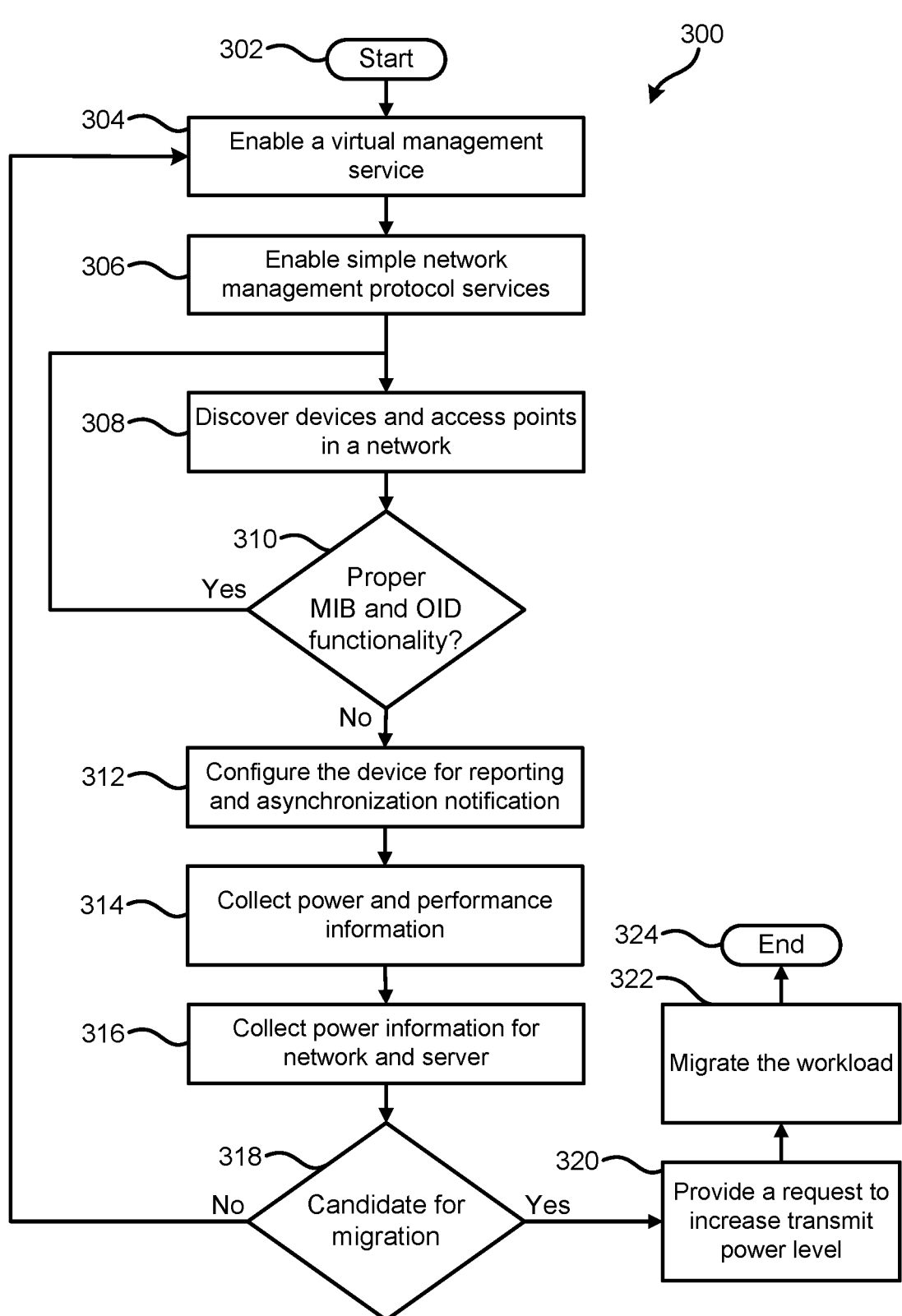
FIG. 3 is a flow diagram of a method for performing a virtual management service to implement a service level agreement according to at least one embodiment of the present disclosure.

FIG. 3 is a flow diagram of a method 300 for performing a virtual management service to implement a service level agreement according to at least one embodiment of the present disclosure, starting at block 302. It will be readily appreciated that not every method step set forth in this flow diagram is always necessary, and that certain steps of the methods may be combined, performed simultaneously, in a different order, or perhaps omitted, without varying from the scope of the disclosure. FIG. 3 may be employed in whole, or in part, processor 110 of information handling system 102, processor 120 of remote monitoring device 104 and processor 130 of access point 106 of FIG. 1, or any other type of controller, device, module, processor, or any combination thereof, operable to employ all, or portions of, the method of FIG. 3.

At block 304, a virtual management service is enabled. In an example, the virtual management service may be enabled in an end-point device or information handling system of a network. This virtual management service may be utilized to set up different workload management services within the information handling system. At block 306, SNMP services are enabled. In certain examples, the SNMP services or agents may enable the information handling system to communicate with other devices in a network. These devices may be a remote monitoring device, an access point, one or more remote compute devices, or the like.

At block 308, devices and access points in a network are discovered. In an example, the devices and access points may be discovered via the SNMP agent of the information handling system and any other SNMP agents being executed in different components of the network. At block 310, a determination is made whether proper MIB and OID functionality is available in the access point. In an example, the proper MIB and OID functionality determination may be based on whether the information handling system may be able to communicate with the access point to retrieve information or data associated with the OID.

If proper MIB and OID functionality is not available, the flow continues as stated above at block 308. If proper MIB and OID functionality is available, the device is configured for reporting and asynchronization notifications at block 312. At block 314, power and performance information is collected. In an example, the power and performance information may be associated with applications being executed within the information handling system. This information may also include data to indicate whether resources in the information handling system may support the power and performance needs of the workload of the application.

At block 316, power and other resource information for the network and a server are collected. In certain examples, the power information may be collected in response to an OID query request provided via SNMP communication from the information handling system to access point. In an example, the power and other resource information may be collected in any suitable manner. For example, a remote monitoring device may collect overall power information for the network and the overall power information may include the power consumption of the access point. In certain examples, the information may further include the latency of network, an overall power consumption of the network, carbon efficiency of a remote compute device, reliability of the network, or the like.

At block 318, a determination is made whether the workload is a candidate for migration. In an example, the determination may be made in any suitable manner. For example, the determination may be made based on whether the collected information complies with an SLA for the workload of a target application. In an example, the SLA may be a network SLA that includes, but is not limited to, a latency, a performance level, a power consumption level, a carbon footprint level, a reliability level, and an efficiency level. In certain examples, the SLA may also include requirements for different resources needed to execute the workload of application 126, such as a GPU requirement, a CPU requirement, or the like.

If the workload is not a candidate for migration, the flow continues as stated above at block 304. If the workload is a candidate for migration, a request to increase transmit power level is provided at block 320. In an example, request to increase the transmit power level may be provided from the information handling system to the access point. The transmit power level may be associated with a network interface card, a radio card, or the like of the access point. At block 322, the workload is migrated and the flow ends at block 324. In an example, the workload may be migrated to any suitable remote compute device that includes the proper resources to execute the workload according to the SLA for the application.

Figure 4:
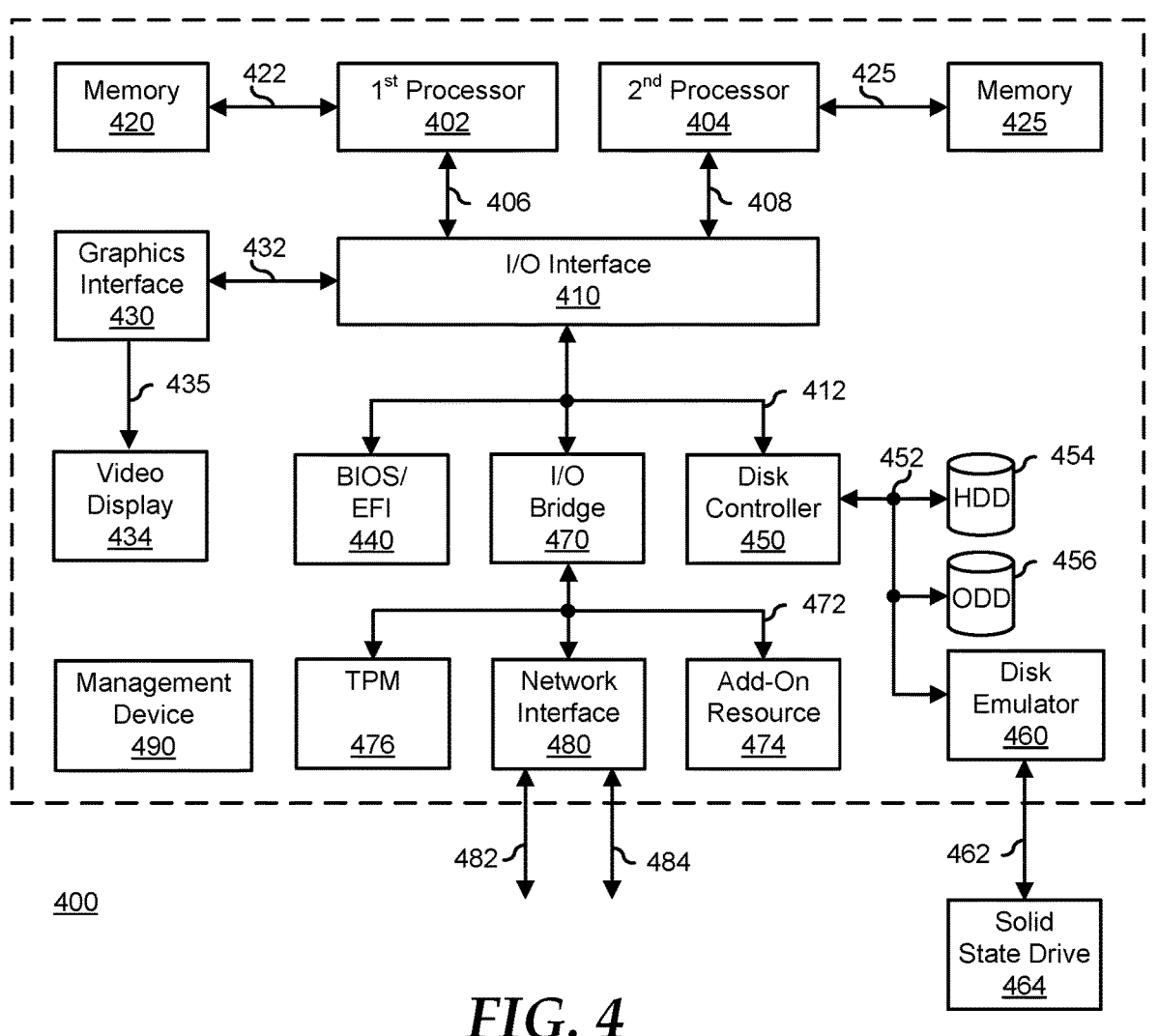
FIG. 4 is a block diagram of a general information handling system according to an embodiment of the present disclosure.

FIG. 4 shows a generalized embodiment of an information handling system 400 according to an embodiment of the present disclosure. Information handling system 400 may be substantially similar to information handling system 102 of FIG. 1. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432 and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 4394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412 or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400.

Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:

a memory to store a service level agreement for an application; and a processor to communicate with the memory, the processor to:

determine a proper object identifier for data of an access point of a network;

provide a data query to the access point to collect the data, wherein the data query includes the proper object identifier;

collect the data, wherein the data is associated with the network and includes a power consumption of the access point of the network;

based on the collected data and the service level agreement of the application, determine whether the application is a candidate for migration;

in response to the application being a candidate for migration, provide a transmit power level increase request to the access point;

after the transmit power level increase request is provided, increase a transmit power level in the access point;

when the transmit power level is increased, provide the application to a remote compute device of the network via the access point; and after the application is provided to the remote compute device, decrease the transmit power level of the access point.

2. The information handling system of claim 1, wherein the data further includes a latency of the network, resources available in the network, and an overall power consumption of the network.

3. The information handling system of claim 1, wherein the data associated with the network is collected via a remote monitoring device, wherein the remote monitoring device is configured to communicate with the information handling system and with the access point.

4. The information handling system of claim 1, wherein a simple network management protocol agent is a containerized service capable of being exectued in the access point.

5. The information handling system of claim 1, wherein the service level agreement includes a power and performance requirement for the application.

6. The information handling system of claim 1, wherein the service level agreement includes a latency level, a performance level, a power consumption level, a carbon footprint level, a reliability level, and an efficiency level.

7. A method comprising:

storing, by a processor of an information handling system, a service level agreement for an application in a memory of the information handling system;

enabling a simple network management protocol agent, wherein the simple network management protocol allows the processor to communicate with an access point;

discovering, via the simple network management protocol, the access point and a remote compute device in a network;

determining a proper object identifier for data of the access point;

providing a data query to the access point to collect data associated with the network, wherein the data query includes the proper object identifier;

collecting the data associated with the network, wherein the data includes a power consumption of the access point of the network;

based on the collected data and the service level agreement of the application, determining whether the application is a candidate for migration;

in response to the application being a candidate for migration, providing a transmit power level increase request to the access point;

after the transmit power level increase request is provided, increase a transmit power level in the access point;

when the transmit power level is increased, providing, by the processor, the application to a remote compute device of the network via the access point; and after the application is provided to the remote compute device, decreasing the transmit power level of the access point.

8. The method of claim 7, wherein the data further includes a latency of the network, resources available in the network, and an overall power consumption of the network.

9. The method of claim 7, wherein the data associated with the network is collected via a remote monitoring device, wherein the remote monitoring device is configured to communicate with the information handling system and with the access point.

10. The method of claim 7, wherein the simple network management protocol agent is a containerized service capable of being exectued in the access point.

11. The method of claim 7, wherein the service level agreement includes a power and performance requirement for the application.

12. The method of claim 7, wherein the service level agreement includes a latency level, a performance level, a power consumption level, a carbon footprint level, a reliability level, and an efficiency level.

13. An information handling system comprising:

a memory to store a service level agreement for an application; and a processor to:

enable a simple network management protocol agent, wherein the simple network management protocol allows the processor to communicate with an access point;

discover, via the simple network management protocol, the access point and a remote compute device in a network;

determine a proper object identifier for the data of the access point;

provide a data query to the access point to collect data associated with a network, wherein the data query includes the proper object identifier;

collect the data associated with the network, wherein the data includes a power consumption of the access point of the network;

based on the collected data and the service level agreement of the application, determine whether the application is a candidate for migration;

if the application is a candidate for migration, then provide a transmit power level increase request to the access point;

after the transmit power level increase request is provided, increase a transmit power level in the access point;

when the transmit power level is increased, provide the application to a remote compute device of the network via the access point; and after the application is provided to the remote compute device, decrease the transmit power level of the access point.

14. The information handling system of claim 13, wherein the simple network management protocol agent is a containerized service capable of being exectued in the access point.

15. The information handling system of claim 13, wherein the data further includes a latency of the network, resources available in the network, and an overall power consumption of the network.

16. The information handling system of claim 13, wherein the service level agreement includes a power and performance requirement for the application.

* * * * *